United States Patent
Torsner et al.

(10) Patent No.: US 8,284,777 B2
(45) Date of Patent: Oct. 9, 2012

(54) UPLINK CELL CHANGES IN A MOBILE COMMUNICATION NETWORK

(75) Inventors: Per Johan Torsner, Masaby (FI); Michael Meyer, Aachen (DE); Shyam Chakraborty, Londonderry (IR); Mats Sågfors, Kyrkslätt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1040 days.

(21) Appl. No.: 12/090,637

(22) PCT Filed: Dec. 14, 2005

(86) PCT No.: PCT/EP2005/056776
§ 371 (c)(1),
(2), (4) Date: Apr. 17, 2008

(87) PCT Pub. No.: WO2007/045279
PCT Pub. Date: Apr. 26, 2007

(65) Prior Publication Data
US 2008/0267129 A1    Oct. 30, 2008

(30) Foreign Application Priority Data
Oct. 17, 2005    (SE) .................................. 0502301

(51) Int. Cl.
*H04L 12/28*    (2006.01)
*H04L 1/00*    (2006.01)
*H04L 1/14*    (2006.01)
*H04W 4/00*    (2009.01)
*H04W 36/00*    (2009.01)
*H04B 1/00*    (2006.01)

(52) U.S. Cl. .......... 370/394; 370/230; 370/331; 455/69; 455/437; 714/750

(58) Field of Classification Search .................. 370/230, 370/235, 328, 331–333, 394, 412; 455/432.1, 455/436–437, 442, 67.13, 69; 714/749–752
See application file for complete search history.

(56) References Cited

U.S. PATENT DOCUMENTS 6,993,342 B2 *    1/2006    Kuchibhotla et al. ......... 455/450
(Continued)

FOREIGN PATENT DOCUMENTS
EP    1 519 519 A1    3/2005

OTHER PUBLICATIONS

3GPP, 3rd Generation Partnership Project; Technical Specification Group Radio Access Network; FDD Enhanced Uplink; Overall description; Stage 2 (Release 6). 3GPP TS 25 309 v6.4.0 (Sep. 2005).

(Continued)

*Primary Examiner* — Michael Thier
*Assistant Examiner* — Redentor Pasia

(57) ABSTRACT

A method in a user equipment (UE) includes transmitting, to a first radio base station, one or more protocol data units (PDUs) that are each associated with a respective Internet Protocol (IP) packet. The method also includes receiving one or more feedback indications from the first radio base station, each indicating whether a corresponding PDU was successfully received, and transmitting a retransmission of at least one PDU based on the feedback indications. Additionally, the method includes determining a time point for performing a cell change based on whether the first radio base station has not successfully received all of the PDUs associated with IP packets for which a complete IP packet has been transmitted and performing the cell change at the determined time point.

10 Claims, 3 Drawing Sheets

PDU not transmitted

PDU transmitted but not received in Node B

PDU transmitted and received in Node B

U.S. PATENT DOCUMENTS

| | | | | |
|---|---|---|---|---|
| 7,206,581 B2* | 4/2007 | Zhang et al. | ............ | 455/442 |
| 2002/0196760 A1* | 12/2002 | Malomsoky et al. | ......... | 370/338 |
| 2003/0131124 A1* | 7/2003 | Yi et al. | .................. | 709/236 |
| 2003/0224774 A1* | 12/2003 | Cheng et al. | ............ | 455/422.1 |
| 2004/0160925 A1* | 8/2004 | Heo et al. | ............... | 370/335 |
| 2004/0219917 A1* | 11/2004 | Love et al. | ............... | 455/436 |
| 2004/0228313 A1* | 11/2004 | Cheng et al. | ............ | 370/342 |
| 2006/0133323 A1* | 6/2006 | Obuchi et al. | ............. | 370/335 |

OTHER PUBLICATIONS

3GPP, 3rd Generation Partnership Project; Technical Specification Group Radio Access Network; Medium Access Control (MAC) protocol specification (Release 6) 3GPP TS 25.321 v6.6.0 (Sep. 2005).

3GPP, 3rd Generation Partnership Project; Technical Specification Group Radio Access Network; Radio Link Control (RLC) protocol specification (Release 6). 3GPP TS 25.322 v6.5.0 (Sep. 2005).

* cited by examiner

US 8,284,777 B2

UPLINK CELL CHANGES IN A MOBILE COMMUNICATION NETWORK

FIELD OF THE INVENTION

The present invention relates to methods and arrangements in cellular mobile communication network, in particular to fast and lossless cell changes in the uplink of such communication network.

BACKGROUND OF THE INVENTION

The present invention relates to methods and arrangements in a user equipment (UE) and in a radio access network of a cellular mobile network. An example of such a radio access network is the UMTS terrestrial radio access network (UTRAN). The UTRAN is illustrated in FIG. 1 and comprises at least one Radio Network System 100 connected to the Core Network (CN) 200. The CN is connectable to other networks such as the Internet, other mobile networks e.g. GSM systems and fixed telephony networks. The RNS 100 comprises at least one Radio Network Controller 110. Furthermore, the respective RNC 110 controls a plurality of Node-Bs 120,130 that are connected to the RNC by means of the Iub interface 140. Each Node B covers one or more cells and is arranged to serve the User Equipment (UE) 300 within said cell. Finally, the UE 300, also referred to as mobile terminal, is connected to one or more Node Bs over the Wideband Code Division Multiple Access (WCDMA) based radio interface 150. The network of FIG. 1 is also referred to as a WCDMA network and is based on the WCDMA standard specified by the 3:rd Generation Partnership Project (3GPP).

Requirements for mobile data access are increasing and demand for bandwidth is growing. To meet these needs the High Speed Data Packet Access (HSDPA) specification has been defined. HSDPA is based on WCDMA evolution standardized as part of 3GPP Release 5 WCDMA specifications. HSDPA is a packet-based data service in WCDMA downlink with data transmission peak rate up to 14.4 Mbps over a 5 MHz bandwidth. Thus HSDPA improves system capacity and increases user data rates in the downlink direction. The improved performance is based on adaptive modulation and coding, a fast scheduling function and fast retransmissions with soft combining and incremental redundancy. HSDPA utilizes a transport channel named the High Speed Downlink Shared Channel (HS-DSCH) that makes efficient use of valuable radio frequency resources and takes bursty packet data into account. This is a shared transport channel which means that resources, such as channelization codes, transmission power and infra structure hardware, is shared between several users. HS-DSCH supports HARQ as a fast and resource-efficient method for combating transmission errors.

In 3GPP Release 6, the WCDMA standard is further extended with the Enhanced Uplink concept by introducing the Enhanced Dedicated Transport Channel, E-DCH. A further description can be found in 3GPP TS 25.309 "FDD Enhanced Uplink; Overall description". This concept introduces considerably higher peak data-rates in the WCDMA uplink. Features introduced with E-DCH include fast scheduling and fast Hybrid Automatic Repeat request (HARQ) with soft combining. Fast scheduling means that the Node B can indicate to each UE the rate the UE is allowed to transmit with. This can be done every TTI, i.e. fast. Thus, the network is able to control the interference in the system very well.

HARQ is a more advanced form of an ARQ retransmission scheme. In conventional ARQ schemes the receiver checks if a packet is received correctly. If it is not received correctly, the erroneous packet is discarded and a retransmission is requested. With HARQ the erroneous packet is not discarded. Instead the packet is kept and soft combined with the retransmission. That implies that even if neither the first transmission nor the retransmission would facilitate a successful decoding when received alone, they may be combined to decode the packet correctly. This means that, compared to conventional ARQ, fewer retransmissions are required.

For cellular systems that support full mobility, it is a particular challenge to support fast, seamless and lossless cell changes. This is true both for already deployed systems, e.g. GSM/GPRS, WCDMA, CDMA2000, and also for future systems, e.g. as depicted in 3GPP UTRAN Long Term Evolution (LTE) or 4G-systems.

In the 3GPP, work is ongoing concerning the evolution of UTRAN denoted as UTRAN long-term evolution (LTE). In LTE soft handover in uplink is considered as one way to increase the coverage and throughput. Soft handover, also denoted macro diversity, implies that the UE is connected to more than one base station simultaneously, and therefore transmits/receives the same information to/from the connected base stations. Soft handover, however, requires a central anchor node in the radio access network (RAN) where the packets from different radio base stations are combined. In LTE, it is possible that no central anchor node in RAN will exist from a user plane perspective (a central node in the control plane could still exist). In this scenario soft handover would not be supported. Instead, hard handovers could be used, i.e. data is only transmitted to one radio base station at a time. Such a hard handover is also referred to as cell change. To reach a high performance it is desirable to perform the cell change as fast as possible when a stronger cell is detected which could potentially lead to frequent cell changes.

In HSDPA and enhanced uplink the cell changes are performed independent of the ongoing HARQ retransmissions. This means that the outstanding data is lost at the cell change. In HSDPA/enhanced uplink these losses are recovered by the RLC layer, which provides retransmissions between RNC and UE. If no anchor node in RAN exists, the RLC layer, if at all present, cannot recover from these losses. Thus a solution is needed to provide fast lossless cell change, while still avoiding duplicates and maintaining in-sequence delivery. In WCDMA enhanced uplink in-sequence delivery is performed by reordering in the anchor node based on MAC level sequence numbers transmitted by the UE. This is not possible in a scenario without anchor node.

It is foreseen that a HARQ protocol is employed between the UE and the radio base station in LTE, similar to WCDMA enhanced uplink. This implies, if no special means are taken, that the data that is outstanding, i.e. has been transmitted but no ACK has been received, is lost at the cell change. This would mean that it is not possible to provide for a lossless cell change. Alternatively, the outstanding data could be retransmitted in the new radio base station, i.e. the radio base station after handover, which would avoid the data loss. This would however lead to unnecessary data transmissions and duplicated data in case the data was already received correctly in the old radio base station.

The HARQ scheme in LTE is expected to be similar to the scheme used in HSPDA and WCDMA enhanced uplink, i.e. an n-channel stop and wait protocol is used. Soft combining is applied, i.e. in case of retransmissions the retransmitted data is combined with previously stored information. N-channel stop and wait is the protocol used for HSDPA. It can be seen as N parallel stop and wait processes. A stop and wait protocol is a simple type of ARQ protocol where one PDU is sent and then the protocol waits (don't send any data) until an ACK/

NACK is received. When the ACK/NACK is received either new data is transmitted or a retransmission is made. The efficiency of this protocols is low since the transmitter waits for the ACK/NACK to be received. In the N-channel stop and wait the Tx can send data in the other processes instead of waiting (but seen on each process its still stop and wait). Thus this protocol combines the simplicity of a stop and wait protocol with the efficiency of a window based ARQ protocol.

It is likely that the HARQ protocol by itself does not provide sufficient reliability due to the properties of the feedback signalling. Thus it is likely that LTE uses a separate layer of ARQ on top of the HARQ layer. In WCDMA this outer ARQ is located in the RLC layer. In LTE the outer ARQ may either be located in an RLC layer or be located in the MAC layer. Therefore, MAC-HARQ is referred to as inner ARQ and the ARQ in the existing RLC is referred to as outer ARQ.

In LTE, two types of Media Access (MAC) adaptation to the transmission media have been discussed, a radio centric MAC and a packet centric MAC.

The Radio Link Control Protocol (RLC) and MAC are layer 2 control protocols in the WCDMA radio access network and are likely to be present in LTE, although the functionality may be slightly modified. RLC in WCDMA provides transparent, acknowledged and unacknowledged services, and maps these services to logical channels. MAC in WCDMA is e.g. responsible for the mapping between the logical channels and the transport channels, for the control of E-DCH transmission including the support for HARQ and for the generation of uplink scheduling information to assist with E-DCH resource allocation. MAC and RLC are further described in TS 25.321 and TS 25.322. In LTE it is likely that a MAC layer is present which includes similar functionality as the WCDMA MAC layer. The RLC layer may be present in LTE but it is also possible that the RLC functionality is moved down to a new MAC layer in LTE.

In the radio centric MAC, which is most likely to be adopted, segmentation is applied either in MAC or in RLC. This means that in case a whole IP packet can not be transmitted in a transmission time interval (TTI) the IP packet is segmented into smaller protocol data units (PDUs) which are transmitted to the radio base station. Typically only a single PDU is transmitted per TTI. The IP packet can only be assembled in the radio base station in case all PDUs carrying segments of the IP packet have been received correctly. The radio base station transmits feedback information (ACK/NACK) for the received PDUs. Thus, when the UE has received positive feedback (ACK) for all PDUs carrying segments of an IP packet it is known that the IP packet is received completely. If the feedback for all PDUs has not yet been received, the UE does not know if the IP packet was received correctly or not but if at least one NACK is received, the UE knows that the IP packet cannot have been received completely.

In the packet centric MAC no segmentation is applied. Instead a complete IP packet is encoded and puncturing is used to reduce the number of bits (if needed) so it can be transmitted in one TTI. Additional redundancy is then transmitted in subsequent TTIs. To achieve a high efficiency the transmitter may transmit redundancy information for the same IP packet in several consecutive TTIs, until the likelihood that the IP packet can be decoded is sufficiently high. The UE then only needs to transmit one single ACK/NACK indication once all the redundancy versions have been received.

SUMMARY OF THE INVENTION

As stated above, it is desired to achieve a solution that provides fast lossless uplink cell change, while still avoiding duplicates and maintaining in-sequence delivery in a network without an anchor node.

Therefore, the object of the present invention is to achieve a fast and lossless uplink cell change of user equipments of a mobile cellular network.

The object of the present invention is achieved by the method and arrangement according to the independent claims.

Preferred embodiments are defined by the dependent claims.

The method according to the present comprising the steps of controlling the HARQ retransmissions and determining the time point for performing the cell change based on the controlled ongoing HARQ retransmissions of outstanding data, makes it possible to achieve a fast and lossless uplink cell change of UEs.

Further, the UE according to the present invention comprising means for controlling the HARQ retransmissions and means for determining the time point for performing the cell change based on the controlled ongoing HARQ retransmissions of outstanding data makes it possible to achieve a fast and lossless uplink cell change of the UE.

According to embodiments the outstanding retransmissions of packet data units for all IP-packets are finalised where the complete IP-packet has been transmitted and the cell change is performed when the outstanding re-transmissions are performed. The cell change may also be performed when a maximum number of re-transmissions is reached.

According to further embodiments one single feedback per outstanding data is received and the cell change is performed after the received single feedback regardless if the feedback was positive or negative. The transmission of the first IP-packet to the second radio base station that was not completely received in the first radio base station may also be started. Further all subsequent IP-packets to said first IP-packet that was not completely received in the first base station may be transmitted even if some of them are completely received in the first radio base station.

Moreover, the present invention relates to a radio base station comprising means for performing reordering of received packets based on a sequence number such that in-sequence delivery is achieved which makes it possible to achieve a fast and lossless uplink cell change of user equipments of a mobile cellular network.

An advantage with the radio base station according to the present invention is that it is possible to avoid transmission of duplicated data and to maintain in-sequence delivery.

DESCRIPTION OF THE INVENTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention relates to uplink cell changes in a mobile communication network, when macro diversity is not applied, e.g. due to lack of anchor node. I.e. a mobile terminal transmits data to a single radio base station. Note that uplink implies the direction from the mobile terminal to the network and an uplink cell means that connections in the uplink direction change cell. Cell change is also referred to as handover. If another radio base station is considered to be a better candidate due to the fact that, e.g., a better radio channel would be available to that radio base station the UE prepares to perform a cell change to a new radio base station according to the description below.

Figure 1:
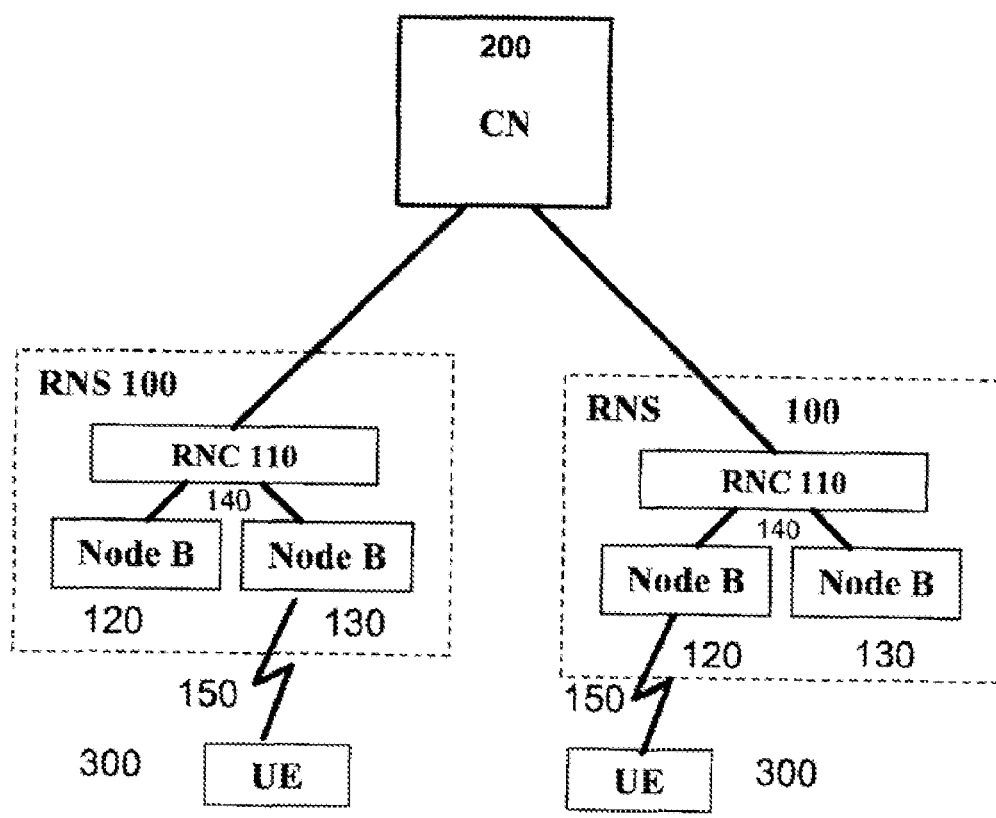
FIG. 1 illustrates an example of an existing mobile cellular network.
Figure 2:
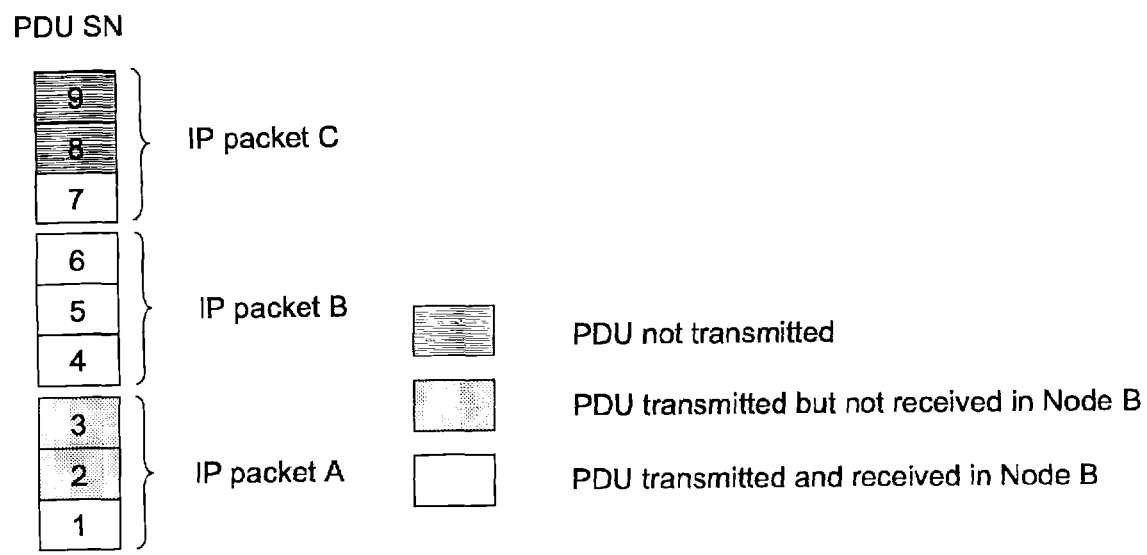
FIG. 2 shows an example of packet handling before a cell change.

FIG. 2 provides an example for illustrating a scenario wherein the present invention may be used. A radio centric MAC is assumed in the example, i.e. each IP packet is segmented into a number of RLC or MAC level PDUs. PDUs 1 through 7 are outstanding, i.e. they have been transmitted but no HARQ feedback has been received for them. PDUs 8 and 9 have not yet been transmitted. Since a reordering mechanism is assumed in the radio base station, none of the IP packets have been forwarded by this radio base station to the Core network/Internet even if the IP-packet B is completely received.

The basic idea of the present invention is to control the HARQ retransmissions and coordinate the time point for performing the cell change, also referred to as handover, with the controlled ongoing inner ARQ retransmissions, also referred to as HARQ retransmissions, of outstanding data. A lossless cell change without transmission of duplicated data can then be achieved with a minimum of additional delay. In-sequence delivery of data is also maintained at the cell change by performing reordering based on MAC level sequence numbers according to an embodiment of the invention. Since the cell change is lossless no outer ARQ retransmissions (e.g. RLC level retransmissions) are needed which implies that the present invention may be applied in a network without an anchor node such as a central RAN node.

According to a first embodiment, the HARQ retransmissions are controlled such that the UE finalises the outstanding retransmissions of PDUs for all IP-packets where the complete IP-packet has been transmitted before performing the cell change. This means that the UE continues making HARQ retransmissions until either ACKs have been received for these outstanding PDUs or the maximum number of retransmissions is reached for the PDUs. For an IP-packet where only parts of the PDUs have been transmitted the UE does not perform any retransmissions. Note that for a packet centric MAC an IP-packet is considered completely transmitted if it is possible to decode the IP-packet from the transmitted information in contrast to a radio centric MAC where a packet is considered to be completely transmitted if all segments of the IP packet are transmitted. After these controlled retransmissions are performed the UE performs the cell change to the new radio base station and starts transmitting data to that radio base station starting from the first IP-packet that was not delivered in the old radio base station. It should be noted that the data that was still outstanding after retransmissions at the time of the cell change due to that the max number of retransmissions was reached for these PDUs are not transmitted to the new radio base station in order to prevent duplicated data. In the example of FIG. 2, this would imply that the UE waits for HARQ feedbacks for PDUs 1 through 7 and then performs retransmissions of PDUs 2 and 3 until ACKs are received for these PDUs, or the maximum number of retransmissions is reached. After the cell change the UE starts transmitting IP-packet C. This behaviour minimises the number of needed re-transmissions but causes some delay for the cell change. However, when considering, e.g., a HARQ Round Trip Time (RTT) of approximately 3 ms and a maximum number of retransmissions of approximately 5 the delay is no longer than 15 ms.

According to a second embodiment the HARQ retransmissions are controlled such that the UE waits until it has received feedback from all outstanding data and then performs the cell change regardless if the feedback was positive or negative. Thus, the UE only waits for one feedback for each outstanding data. Under the new radio base station the UE starts transmitting the first IP-packet that was not completely received in the old radio base station, i.e. in the case of a negative feedback for at least one PDU carrying segments of an IP-packet. The UE continues to transmit all subsequent IP-packets even if some of them may have been completely received in the old radio base station. In case a negative feedback was received for at least one PDU carrying segments of an IP-packet, the UE knows that the IP-packet was not received completely in the old radio base station. The UE can therefore transmit the same IP-packet in the new radio base station without risk for data duplication. Note that for an IP centric MAC several transmissions may be outstanding for the same IP-packet (different redundancy versions of the same packet). In this case the UE needs to wait until the ACK/NACK for the last transmitted redundancy version is received before it knows if the packet was received or not in the radio base station. In the example of FIG. 2 this alternative would mean that the UE starts transmitting the IP-packet A to the new radio base station. Even if IP-packet B was completely received in the old radio base station it was not delivered to the CN/Internet due to in-sequence delivery and the UE consequently transmits this packet also to the new radio base station. This alternative leads to a very fast cell change; however, compared to the first embodiment, some more data needs to be (re-)transmitted to the new radio base station. The maximum delay is one HARQ RTT, i.e. around 3 ms in LTE.

According to a third embodiment the HARQ retransmissions are controlled such that the UE adaptively chooses between the behaviour of the first embodiment and second embodiment described above. The choice depends on the amount of radio resources required to finalise the outstanding retransmissions to the old radio base station compared to the resources required to start transmitting the data to the new radio base station. The UE according to the third embodiment comprises means for estimating the amount of radio resources and time needed to finalise the outstanding retransmissions in the old radio base station. This estimation includes the radio channel quality, the amount of energy that already has been transmitted and the number of active HARQ processes. The UE also comprises means for estimating the amount of radio resources needed to transmit the data to the new radio base station. This estimation includes the radio channel quality to the new radio base station. Based on these estimations the UE comprises means for deciding if it should act according to the behaviour of the first or second embodiment. The UE may decide to act according to the first embodiment if that requires less resources than the second embodiment. Alternatively, the UE may choose to act according to the first embodiment if this makes it possible to transmit the data in a shorter time than for the second embodiment.

Figure 3:
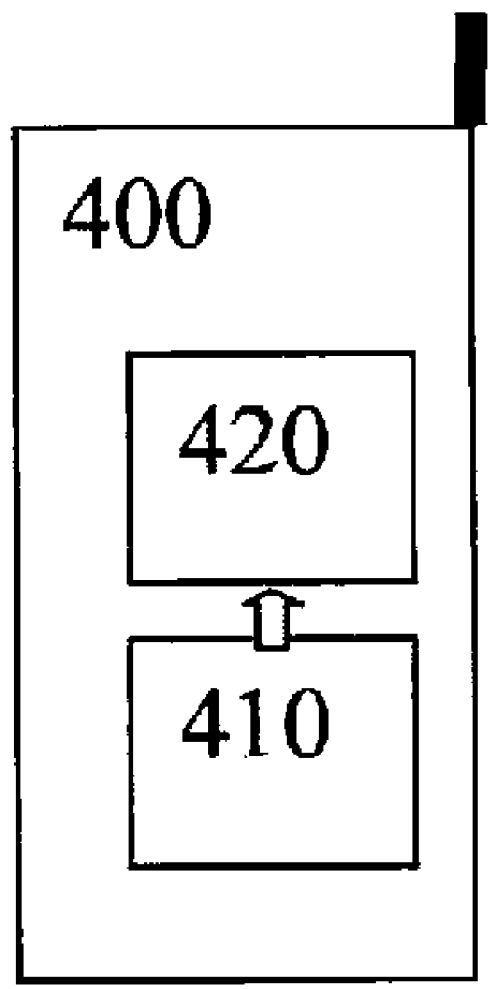
FIG. 3 illustrates schematically a UE according to the present invention.

Thus, the present invention relates to a UE 400 illustrated in FIG. 3 comprising means for controlling 410 the HARQ retransmissions and means for determining 420 the time point for performing the cell change based on the controlled ongoing HARQ retransmissions of outstanding data.

The present invention also relates to a radio base station. The radio base station is connectable in the uplink to a UE according to any of the three described embodiments. The radio base station (i.e. both an old base station and a new base station) comprises means for performing in-sequence delivery by performing reordering based on a sequence number, preferably a MAC level sequence numbers. At cell change, any data present in the old radio base station is discarded.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method implemented by a user equipment (UE) wirelessly connectable to a cellular mobile communication network adapted to perform uplink cell change of the UE from a first radio base station to a second radio base station, the method comprising the steps of:
   transmitting multiple Internet Protocol (IP) packets each comprising one or more protocol data units (PDUs) to the first radio base station;
   receiving one or more feedback indications from the first radio base station, each feedback indication indicating whether a corresponding PDU was successfully received by the first radio base station;
   transmitting one or more retransmissions of at least one of the PDUs based on the received feedback indications;
   coordinating a time point for performing a cell change with controlling ongoing retransmissions of outstanding PDUs, where before performing the cell change, finalizing outstanding retransmissions of PDUs for all IP-packets where a complete IP-packet has been transmitted by continuing to make the retransmissions until either acknowledgments are received for the outstanding PDUs or a maximum number of retransmissions is reached for the outstanding PDUs, wherein for any of the IP packets where only parts of the PDUs have been transmitted then retransmissions are not performed for those IP packets; and
   after the controlled ongoing retransmissions are performed, performing the cell change to the second radio base station and transmitting PDUs to the second radio base station starting from the first IP packet that was not delivered to the first radio base station, wherein the PDUs that were still outstanding after retransmissions at time of the cell change due to that the maximum number of retransmissions was reached are not transmitted to the second radio base station.

2. The method of claim 1, wherein an IP packet is considered completely transmitted if it is possible to decode the IP packet from the transmitted PDUs and retransmissions.

3. The method of claim 1, wherein an IP packet is considered to be completely transmitted if all the associated PDUs are transmitted.

4. A system comprising:
   a first radio base station;
   a second radio base station; and
   a user equipment (UE) wirelessly connectable to a cellular mobile communication network adapted to perform uplink cell change of the UE from the first radio base station to the second radio base station, wherein the UE is configured to:
   transmit multiple Internet Protocol (IP) packets each comprising one or more protocol data units (PDUs) to the first radio base station;
   receive one or more feedback indications from the first radio base station, each feedback indication indicating whether a corresponding PDU was successfully received by the first radio base station;
   transmit one or more retransmissions of at least one of the PDUs based on the received feedback indications;
   coordinate a time point for performing a cell change with controlling ongoing retransmissions of outstanding PDUs, where before performing the cell change, finalizing outstanding retransmissions of PDUs for all IP-packets where a complete IP-packet has been transmitted by continuing to make the retransmissions until either acknowledgments are received for the outstanding PDUs or a maximum number of retransmissions is reached for the outstanding PDUs, wherein for any of the IP packets where only parts of the PDUs have been transmitted then retransmissions are not performed for those IP packets;
   after the controlled ongoing retransmissions are performed, perform the cell change to the second radio base station and transmitting PDUs to the second radio base station starting from the first IP packet that was not delivered to the first radio base station, wherein the PDUs that were still outstanding after retransmissions at time of the cell change due to that the maximum number of retransmissions was reached are not transmitted to the second radio base station.

5. The system of claim 4, wherein an IP packet is considered completely transmitted if it is possible to decode the IP packet from the transmitted PDUs and retransmissions.

6. The system of claim 4, wherein an IP packet is considered to be completely transmitted if all the associated PDUs are transmitted.

7. A method implemented by a user equipment (UE) wirelessly connectable to a cellular mobile communication network adapted to perform uplink cell change of the UE from a first radio base station to a second radio base station, the method comprising the steps of:
   transmitting multiple Internet Protocol (IP) packets each comprising one or more protocol data units (PDUs) to the first radio base station;
   receiving one or more feedback indications from the first radio base station, each feedback indication indicating whether a corresponding PDU was successfully received by the first radio base station;
   transmitting one or more retransmissions of at least one of the PDUs based on the received feedback indications;
   coordinating a time point for performing a cell change with controlling ongoing retransmissions of outstanding PDUs, where before performing the cell change, waiting until receiving feedback indications from all the outstanding PDUs and then performing the cell change regardless if the feedback indications are positive or negative, wherein the UE only waits for one feedback indication for each of the outstanding PDUs; and
   after performing the cell change to the second radio base station, transmitting the first IP packet that was not completely received in the first radio base station, where in case a negative feedback indication was received for at least one PDU carrying segments of an IP packet, the UE knows that this IP packet was not received completely in the first base station thus the UE can transmit the same IP packet to the second radio base station without risk for data duplication.

8. A system comprising:
a first radio base station;
a second radio base station; and
user equipment (UE) wirelessly connectable to a cellular mobile communication network adapted to perform uplink cell change of the UE from the first radio base station to the second radio base station, wherein the UE is configured to:
  transmit multiple Internet Protocol (IP) packets each comprising one or more protocol data units (PDUs) to the first radio base station;
  receive one or more feedback indications from the first radio base station, each feedback indication indicating whether a corresponding PDU was successfully received by the first radio base station;
  transmit one or more retransmissions of at least one of the PDUs based on the received feedback indications;
  coordinate a time point for performing a cell change with controlling ongoing retransmissions of outstanding PDUs, where before performing the cell change, waiting until receiving feedback indications from all the outstanding PDUs and then performing the cell change regardless if the feedback indications are positive or negative, wherein the UE only waits for one feedback indication for each of the outstanding PDUs; and
  after performing the cell change to the second radio base station, transmit the first IP packet that was not completely received in the first radio base station, where in case a negative feedback indication was received for at least one PDU carrying segments of an IP packet, the UE knows that this IP packet was not received completely in the first base station thus the UE can transmit the same IP packet to the second radio base station without risk for data duplication.

9. A method implemented by a user equipment (UE) wirelessly connectable to a cellular mobile communication network adapted to perform uplink cell change of the UE from a first radio base station to a second radio base station, the method comprising the steps of:
  transmitting multiple Internet Protocol (IP) packets each comprising one or more protocol data units (PDUs) to the first radio base station, wherein each of the protocol data units (PDUs) is associated with an Internet Protocol (IP) packet;
  receiving one or more feedback indications from the first radio base station, each feedback indication indicating whether a corresponding PDU was successfully received by the first radio base station;
  transmitting one or more retransmissions of at least one of the PDUs based on the received feedback indications;
  adaptively choosing between behavior of a first process or a second process when coordinating a time point for performing a cell change with controlling ongoing retransmissions of outstanding PDUs;
  wherein the first process includes steps of:
    before performing the cell change, finalizing outstanding retransmissions of PDUs for all IP-packets where a complete IP-packet has been transmitted, by continuing to make the retransmissions until either acknowledgments are received for the outstanding PDUs or a maximum number of retransmissions is reached for the outstanding PDUs, wherein for any of the IP packets where only parts of the PDUs have been transmitted then retransmissions are not performed for those IP packets; and
    after the controlled ongoing retransmissions are performed, performing the cell change to the second radio base station and transmitting PDUs to the second radio base station starting from the first IP packet that was not delivered to the first radio base station, wherein the PDUs that were still outstanding after retransmissions at time of the cell change due to that the maximum number of retransmissions was reached are not transmitted to the second radio base station;
  wherein the second process includes steps of:
    before performing the cell change, waiting until receiving feedback indications from all the outstanding PDUs and then performing the cell change regardless if the feedback indications are positive or negative, wherein the UE only waits for one feedback indication for each of the outstanding PDUs; and
    after performing the cell change to the second radio base station, transmitting the first IP packet that was not completely received in the first radio base station, where in case a negative feedback indication was received for at least one PDU carrying segments of an IP packet, the UE knows that the same IP packet was not received completely in the first base station thus the UE can transmit the same IP packet to the second radio base station without risk for data duplication; and
  the adaptively choosing step includes:
  estimating an amount of radio resources and time needed to finalize outstanding retransmissions to the first radio base station by estimating at least one of a radio channel quality, an amount of energy that has already been transmitted and a number of active retransmission processes;
  estimating an amount of radio resources needed to transmit data to the second radio base station by estimating a radio channel quality to the second radio base station; and
  deciding to act according to the behavior of the first process or the second process based on results of the two estimating steps.

10. A system comprising:
a first radio base station;
a second radio base station; and
a user equipment (UE) wirelessly connectable to a cellular mobile communication network adapted to perform uplink cell change of the UE from the first radio base station to the second radio base station, wherein the UE is configured to:
  transmit multiple Internet Protocol (IP) packets each comprising one or more protocol data units (PDUs) to the first radio base station;
  receive one or more feedback indications from the first radio base station, each feedback indication indicating whether a corresponding PDU was successfully received by the first radio base station;
  transmit one or more retransmissions of at least one of the PDUs based on the received feedback indications;
  adaptively choose between behavior of a first process or a second process when coordinating a time point for performing a cell change with controlling ongoing retransmissions of outstanding PDUs;
  wherein the first process includes steps of:
    before performing the cell change, finalizing outstanding retransmissions of PDUs for all IP-packets where a complete IP-packet has been transmitted, by continuing to make the retransmissions until either acknowledgments are received for the outstanding PDUs or a maximum number of retransmissions is reached for the outstanding PDUs, wherein for any of the IP packets where only parts of the PDUs have been transmitted then retransmissions are not performed for those IP packets; and after the controlled ongoing retransmissions are performed, performing the cell change to the second radio base station and transmitting PDUs to the second radio base station starting from the first IP packet that was not delivered to the first radio base station, wherein the PDUs that were still outstanding after retransmissions at time of the cell change due to that the maximum number of retransmissions was reached are not transmitted to the second radio base station;

wherein the second process includes steps of:

before performing the cell change, waiting until receiving feedback indications from all the outstanding PDUs and then performing the cell change regardless if the feedback indications are positive or negative, wherein the UE only waits for one feedback indication for each of the outstanding PDUs; and after performing the cell change to the second radio base station, transmitting the first IP packet that was not completely received in the first radio base station, where in case a negative feedback indication was received for at least one PDU carrying segments of an IP packet, the UE knows that this IP packet was not received completely in the first base station thus the UE can transmit the same IP packet to the second radio base station without risk for data duplication; and the adaptively choosing step includes:

estimate an amount of radio resources and time needed to finalize outstanding retransmissions to the first radio base station by estimating at least one of a radio channel quality, an amount of energy that has already been transmitted and a number of active retransmission processes;

estimate an amount of radio resources needed to transmit data to the second radio base station by estimating a radio channel quality to the second radio base station; and decide to act according to the behavior of the first process or the second process based on results of the two estimating steps.

* * * * *